United States Patent [19]
Baitinger et al.

[11] 3,866,176
[45] Feb. 11, 1975

[54] ADDRESS SELECTION CIRCUIT FOR STORAGE ARRAYS

[75] Inventors: Utz G. Baitinger, Stuttgart; Werner Otto Haug; Manfred Illi, both of Boeblingen, all of Germany

[73] Assignee: International Business Machines Corporation, Armonk, N.Y.

[22] Filed: Jan. 31, 1974

[21] Appl. No.: 438,159

[30] Foreign Application Priority Data
Aug. 11, 1973 Germany............................ 2340814

[52] U.S. Cl............................................... 340/166 R
[51] Int. Cl............................................... H04q 3/00
[58] Field of Search.......... 340/166 R; 307/208, 269

[56] References Cited
UNITED STATES PATENTS
3,816,725 6/1974 Greer............................. 340/166 X

*Primary Examiner*—Harold I. Pitts
*Attorney, Agent, or Firm*—Howard J. Walter, Jr.

[57] ABSTRACT

For each binary position of the coded addresses the selection device shows a phase splitter whose two outputs are connected to associated inputs of decoders. In order to increase the noise resistance jointly clocked AND gates are inserted at the inputs and outputs of the phase splitters, and at the outputs of the decoders.

An automatic optimum determination of the conditioning time of the AND gates at the outputs of phase splitters is achieved by a delayed clock pulse DCS1 derived from a clock pulse T of AND gates at the input of the phase splitters. For that purpose, clock pulse T is derived at the output of the AND gates at the input of phase splitters and, via a simulated phase splitter circuit integrated on the chip, is applied as clock pulse DCS1 to the clock inputs of the AND gates at the output of the functional phase splitters.

The determination of the conditioning time of AND gates at the output of the decoder is performed accordingly at the output of decoder. In that process, a clock signal is derived from the output of AND gates at the output of phase splitters, and applied as a delayed clock signal DCS2 via a simulation of one of decoders to the clock inputs of the AND gates at the output of the decoders.

15 Claims, 7 Drawing Figures

ADDRESS SELECTION CIRCUIT FOR STORAGE ARRAYS

BACKGROUND OF THE INVENTION

1. Field of the Invention:

The invention relates to a selection device for monolithically integrated storage arrangements where each binary position of the coded addresses a true-complement generator is provided whose outputs are connected to associated inputs of the decoders of a decoding device, and where for increasing the noise resistance at the inputs and at the outputs of the true-complement generators, and at the outputs of the decoders, jointly clocked AND gates are provided.

2. Description of the Prior Art:

The basic structure of a selection device is for instance described in the De Gruyter textbook "Schaltkreistechnologien fur digitale Rechenanlagen" by U. G. Baitinger, 1973. According thereto, the operation of a storage array is equivalent to the continuous solution of the problem of selecting, from a plurality of individual bistable storage cells, one predetermined cell so as to be able to write in, or read out, a binary quantity at a specified location. This is achieved by associating to each storage cell an address which is advisably coded in the form of a binary number. Prior to the access to a storage cell the associated address instruction has to be decoded so that the respective cell is selected. If a plurality of individual storage cells is combined to form one large storage unit this is advisably performed in the form of a matrix, i.e. in rows and columns. By numbering both the rows and the columns each storage cell is clearly identified by the addresses of the associated row and column at whose point of intersection it is located. Upon a selection, there exists one fully selected storage cell, several half-selected storage cells, within the same row and within the same column, and for the rest of the matrix unselected storage cells. Each of the storage cells generally consisting of a flipflop is capable of two stable logic states, 0, or 1, i.e. it can store the smallest information unit (bit). A number of such flipflops can store a larger information unit (word) which can be of differing length and which in its structure resembles a binary number consisting of the characters 0 and 1. The address of a row thus identifies an entire word so that the term "word address" is equally used in that connection. The bits forming the words are in the differing columns; therefore, the address of a column is also called "bit address." The numbering (addressing) of rows and columns is advisably performed with binary numbers. Storage matrices generally contain $2^n$ -rows and $2^m$-columns, i.e. $2^{n+m}$ storage cells in order to utilize all positions of the binary number.

The problem now lies in decoding the binary coded addresses, i.e. to associate them by means of switching functions to the rows or columns, respectively, of the storage matrix. It shall be assumed in that connection that a row or column is considered selected when the associated switching function supplies the logical output 1.

The two switching functions which supply an output 1 for one single combination of the inputs are the AND and NOR functions. Both can therefore be used for decoding. The AND function supplies output 1, i.e. selects the associated row or column, respectively, only in those cases where all inputs are simultaneously 1, too. For the NOR function, the same applies to the input 0. There only remains the process of inverting, by means of a Not-function, the individual positions of the addresses coded as binary numbers if desired. Thus, the decoding to be performed during a selection is settled. In a decoding by means of NOR-functions therefore the positions of the binary bit addresses are applied either directly to the inputs of the NOR-functions (provided they are 0 already), or read in via a Not-function (provided they are 1). Consequently, the selection requires for each binary position of the encoded address a true-complement generator which is connected to the inputs of the NOR-function.

For selecting a single row from a matrix of four rows, two address bits are required. For this section four NOR gates and two true-complement generators are needed. In order to increase noise resistance jointly clocked AND gates are provided at the input of the true-complement generators, between the outputs of the true-complement generators and the inputs of the decoder, and at the outputs of the decoders. These AND gates are not opened until all address signals have been applied. In this manner it is made sure that noise signals occurring between the clock times do not stimulate any desired selection.

The signal path to be travelled by the address signal associated with each binary position begins at one of the AND gates at the input of a true-complement generator, passes through the true-complement generator, through an AND gate, then through a decoder, and finally through another AND gate at the output of the decoder. As the signals of all binary positions of an address are transferred, by means of the clocked AND gates, always simultaneously and in parallel via the true-complement generators and then via the decoders their clocking has to be done with a time lag relative to each other. Basing on the clocking time of the AND gate at the input of the true-complement generators the AND gates at the output of these generators must not be clocked before all address signals have passed through the generators. Accordingly, the clock time of the AND gates at the outputs of the decoder have to be delayed until it has been made sure that all address signals have passed through their associated decoder.

It is prior art and usual practice to generate these delays by means of a delay which is performed external to the integrated semiconductor chip containing the selection circuit for the reason that up to now a delay line with acceptable tolerance could not be made on the integrated semiconductor chip itself. Effecting the delay outside the integrated chip has the following disadvantages. The delay line involves additional costs. The inaccuracy of the delay, caused by the delay line itself but above all by the driver stages between delay line and the storage chip to be selected, increases the access time of the storage. The main disadvantage consists in that the duration of the delay is determined by the slowest true-complement generator, or the slowest decoder of the selection device, respectively. Consequently, there is an unnecessarily long delay in all those cases that do not involve the most unfavourable conditions. Owing to the fact that the delay time has to adjust itself to the slowest chip with the least favourable conditions, i.e. most unfavourable supply voltage and temperature, the higher speed of quicker chips in more favourable conditions cannot be utilized.

These disadvantages are particularly relevant for integrated monolithic memory circuits in FET technology as there dynamic true-complement generators and decoders are frequently used. These dynamic circuits have the advantage of low power dissipation but on the other hand they have the disadvantage that the above-mentioned delays are relatively long and undefined. This is due to the fact that in such circuits, during addressing, capacities have to be discharged and charged.

SUMMARY OF THE INVENTION

It is the object of the invention to provide a selection device of the above-specified type which guarantees the lowest possible access time of the storage, does not involve any particular complexity, and which at the same time can be realized with the selection device in the same manufacturing procedure.

According to the invention, this object relating to a selection device of the above-described type is achieved in that the clock inputs for the AND gates at the outputs of the true-complement generators is derived via a simulation circuit and the clock inputs to the AND gates at the outputs of all decoder stages are derived from the outputs of the AND gates at the two outputs of one of the true-complement generators via a decoder simulation circuit.

A particularly advantageous embodiment consists in that each true-complement generator has an input for one of the encoded low order addresses, and an input for a decoded higher order address, and that the output of the AND gate for the decoded higher order address is applied to the clock inputs of the AND gates at the outputs of all true-complement generators, and that the outputs of the AND gates at the two outputs of one of the true-complement generators are applied via a decoder simulation to the clock inputs of the AND gates at the outputs of all decoders. An advantageous embodiment consists in that a clock pulse source is applied to the clock inputs of the AND gates at the inputs of the true-complement generators, and that the output of the AND gate for the decoded higher order address is applied to the clock inputs of the AND gates at the outputs of all true-complement generators via a simulation of a true-complement generator.

In the inventive selection device, the necessary delay is generated on the semiconductor chip itself. The necessary accuracy of the delay is achieved in that the logic circuits necessitating the delay are simulated in the delay line. As the selection device and the simulation generating the delay are provided on a monolithic semiconductor chip and have the same parameters owing to their corresponding structure, the delay achieved is precisely that required for all conditions, irrespective of the absolute manufacturing tolerances, so that very simple addressing of the storage with optimum access time is achieved.

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Figure 1:
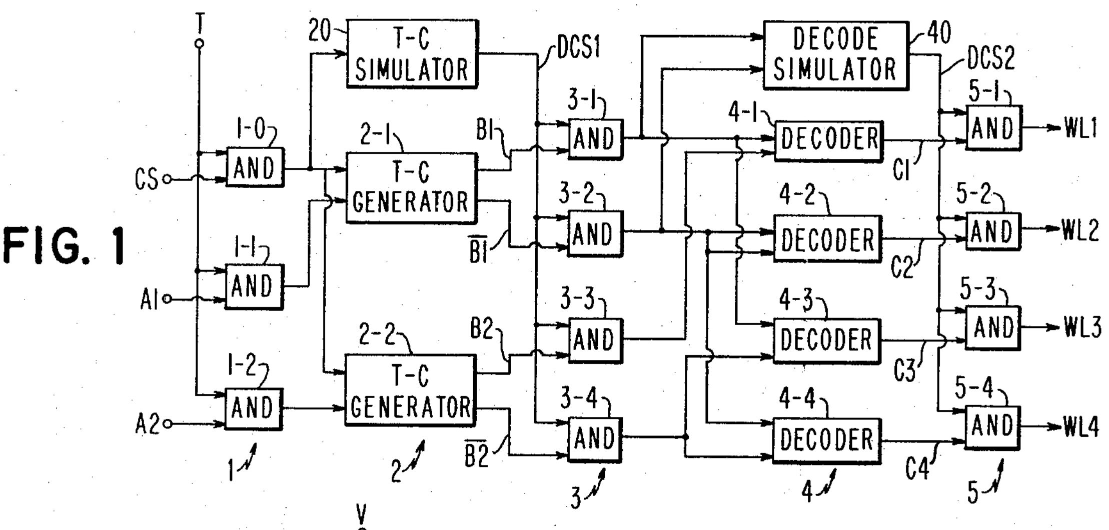
FIG. 1 is a block diagram of a preferred embodiment of the inventive selection device, showing the interconnection of the true-complement generators and decoders.

As the basis of the selections in the operation of a matrix memory can be assumed to be generally known, and as furthermore a short specification thereof has been given in the introductory description, the inventive selection device according to FIG. 1 has, for the sake of simplicity, been designed only for the decoding of four addresses, for example word lines WL1 to WL4. For the operation of a two-dimensional matrix memory such a selection device should of course be provided for the columns as well as for the rows. The fact to be retained is that by the decoding of 1 of $n$ addresses where $n = 2^x$, $n$ selections can be performed. For this purpose, the selection device requires, in a known manner, x true-complement (T-C) generators, i.e. one for each binary position of the encoded address. Arranged in series thereto by logical combination n decoders are required at whose outputs the decoded n addresses are generated. In the selection device according to FIG. 1, where four word lines WL1 to WL4 are addressed, two T-C generators 2-1 and 2-2, and four NOR decoders 4-1 to 4-4 are therefore provided. In a known manner, AND gates 1-0 to 1-2, and 3-1 to 3-4, respectively, are inserted at each input and at each output of the true-complement generators and at the output of the decoders. These AND gates serve as so-called buffers which, by means of a clock signal, are simultaneously conditioned each time all signals appear at their signal inputs. It is known that this measure is applied in order to increase noise resistance. In the above embodiment, encoded addresses A1 and A2 supplied by a storage address register are applied to the inputs of the AND gates 1-1 and 1-2 connected to the input of T-C generators 2-1 and 2-2. The clock inputs of these two AND gates are connected to a common clock pulse source T. At clocking time, addresses A1 and A2 are applied to the two associated T-C generators 2-1 and 2-2. The true-complement generators form thereof respective true signals B1 and B2, and inverted signals $\overline{B1}$ and $\overline{B2}$. Each one of these signals is applied at the input of an associated AND gate 3-1 to 3-4. If all signals B are present the AND gates 3-1 to 3-4 are conditioned together. The determination of this moment, which is the subject of the invention will be described subsequently. The outputs of AND gates 3-1 to 3-4 are now connected in the known logic combination with inputs of decoders 4-1 to 4-4. In the present example, the gates involved are NOR gates. The NOR function has the effect that depending on the applied address, A1 and/or A2, an address signal is generated only at one respective outputs of the decoder. Also the outputs of the decoder are again connected via AND gates 5-1 to 5-4 serving as buffers to word lines WL1 to WL4 to be selected. The determination of the conditioning moment of the decoded address signals C1 to C4 via AND gates 5-1 to 5-4 to the associated word lines WL1 to WL4 is described below.

As the individual switching elements of the selection device must necessarily produce switching delays, the conditioning moment for AND gates 3, starting from the clock time of clock pulse T, has to be delayed at the output of T-C generators 2 at least until all signals B have passed through the true-complement generators and have reached the input of AND gates 3. The same applies to the conditioning moment of AND gates 5 at the output of decoder 4. This conditioning moment has to be delayed at least until all signals B have passed through decoders 4 and have reached the inputs of AND gates 5. Consequently, the necessary minimum delay times of the conditioning moments are always determined by the slowest selection devices or, in the case of the prior art storage arrangements integrated on semiconductor chips, by the "slowest" chip. Any advantages with respect to time of the "quicker" chips are then lost. Besides, the minimum delay times have to be extended by a margin taking into consideration the least favourable environmental conditions.

Referring still to FIG. 1, the technique for providing automatically the optimum determination of the conditioning moments of the AND gates will be described. First, clock T is presented to an AND gate 1-0 and subsequently to a true-complement simulation circuit, T-C simulator 20, located on the chip with T-C generators 2, and the thus formed delayed pulse DCS1 is used for clocking AND gates 3 at the output of T-C generators 2. Pulse DCS2 for clocking AND gates 5 at the output of decoder 4 is derived and determined by pulse DCS1 automatically and corresponding at an optimum to the actual requirements, in that both the inverted and the true outputs of AND gates 3-1 and 3-2 at the output of true-complement generator 2-1 are connected, via a decoder simulation circuit, decode simulator 40 integrated on the same chip as the decoders, to the clock inputs of AND gates 5. Both AND gates 3-1 and 3-2 have to be included since in the selection process only one respective of these gates supplies an output signal.

In addition to AND gates 1-1 and 1-2 transferring addresses A1 and A2 another AND gate 1-0 clocked therewith is provided at the input of the selection device. To AND gate 1-0 a chip select higher order address pulse CS is applied to effect the selection of the respective chip and allows transfer of low order addresses A1 and A2 to initiate the selection of the wordlines on the respective chip. Since for each selection of the respective chip AND gate 1-0 supplies an output signal, the input of T-C simulator 20 is connected to the output of this AND gate.

It should be pointed out that in simulator circuits 20 and 40 AND gates 1 and 3 do not have to be simulated as their delay is fully taken into consideration in that the two simulations are controlled via the outputs of these AND gates.

The structure of the individual gates of the inventive selection device is actually of secondary importance only, as a plurality of such integrated versions is known and applicable in the inventive selection device. The two simulations merely have to be adapted accordingly. T-C generators 2 execute in the selection process an AND/NAND, or an OR/NOR function, and decoders 4 execute a NOR or an AND function.

Below, specific embodiments of a true-complement generator and its simulation, and of a NOR decoder and its simulation for a storage system in FET technology will be described. The functional description shows that dynamic circuits are involved that have the advantage of low power dissipation and for which the invention is of particular importance as they require addressing pulses with a time-lag relative to each other.

In order to permit a direct comparison of the circuits with the block diagram of FIG. 1 the addresses and signals have been given the same designations.

Figures 2A, 2B:
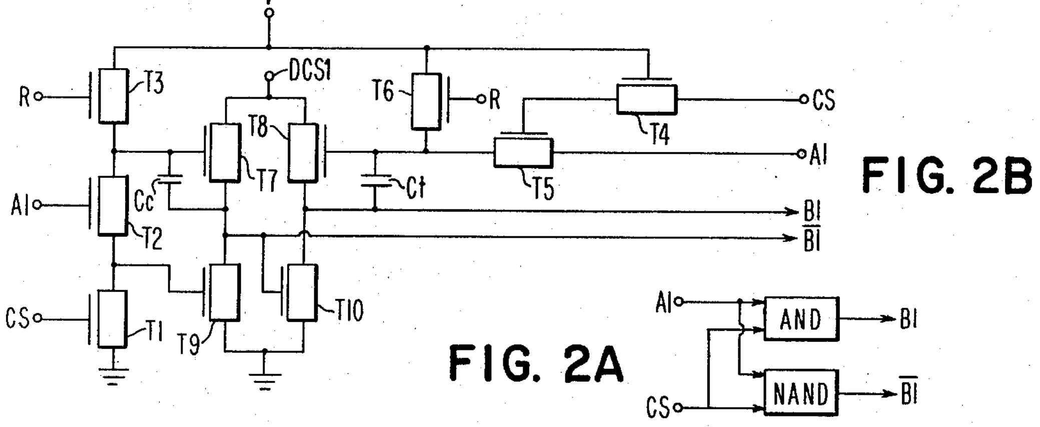
FIG. 2A is a block diagram of a true-complement generator.
FIG. 2B is a circuit diagram of an embodiment of the true-complement generator according to FIG. 2A, applicable in the selection device of FIG. 1, including the AND gates at the two outputs.

FIG. 2A shows the block diagram of T-C generator 2-1 of FIG. 1 which in the present embodiment consists of a NAND and an AND gate. Applied to the inputs of these two gates are address A1 from the address register, as well as the higher address CS serving for chip selection. Subsequently, true signal B1 and inverted signal $\overline{B1}$ are generated of address A1, at the output. FIG. 2B shows the corresponding wiring diagram of the true-complement generator, and AND gates 3-1 and 3-2 at the two outputs. Transistors T1, T2, and T3 form the NAND gate, whereas transistors T4, T5 and T6 represent the AND gate. The two source followers consisting respectively of transistors T7 and T9, and T8 and T10 represent the AND gates and supply at their output the two signals B1 and $\overline{B1}$, respectively. The two capacities Cc and Ct serve for the acceleration of the source followers.

It is now assumed that field effect transistors of the enhancement type are involved. The operation is as follows. During the non-selected state chip selection pulse CS is connected to ground potential, similarly to delayed chip selection pulse DCS1. Thus, transistors T1 and T5 are non-conductive, so that the input for address A1 can be at a discretionary level, or that it can change level. A restore pulse R is applied to the gates transistors T3 and T6 allows the precharging of bootstrap capacitors *Cc* and *Ct*. This charging pulse R is on a level which is equal to the supply voltage V. For that reason, transistors T3 and T6 are conductive so that capacitors *Cc* and *Ct* are charged to voltage V-VT, VT being the threshold voltage of the field effect transistors. As soon as the capacitors have been charged transistors T7 and T8 become conductive so that outputs B1 and $\overline{B1}$ are maintained on the potential of DCS1 which in the non-selected state, as mentioned above, is equal to ground potential. Thus, the conductive state of transistors T9 and T10 is negligible regardless of the potential of address A1.

If the semiconductor chip is to be selected address A1 has to have adopted a defined level first. It is at first assumed that the level has the value of feeding voltage V; then transistors T2 and T9 are conductive. As soon as selection pulse CS switches to the value of feeding voltage V, transistors T1 and T5 are conductive while precharging pulse R switches to ground potential so that transistors T3 and T6 are non-conductive. Thus, capacitor *Cc* is discharged via transistors T2 and T1 while capacitor *Ct* remains charged. After capacitor *Cc* has been discharged, transistors T7 and T10 are non-conductive whereas transistors T8 and T9 are conductive. Now, pulse DCS1 can switch to the value of feeding voltage V. Via transistor T8 it is transferred to the output for signal B1, capacitor *Ct* remaining charged, i.e. the gate-source voltage of transistor T8 remaining constant and the transistor correspondingly conductive. The output for signal $\overline{B1}$ is clamped at ground potential via transistor T9.

If upon selection address signal A1 is at ground potential transistors T2 and T9 are non-conductive. Selection pulse CS now switches again to supply voltage V, and precharging pulse R to ground potential. Subsequently, transistors T1 and T are conductive, whereas transistors T3 and T6 are non-conductive. Capacitor *Cc* remains charged since transistor T2 is non-conductive, as mentioned above, while capacitor *Ct* is discharge via transistor T5, to the potential of address signal A1 which had been assumed to be ground potential. Thus, transistors T8 and T9 are non-conductive, whereas transistor T7 is conductive. Pulse DCS1 which is now switched to the feeding voltage is transferred to the output for the signal $\overline{B1}$, transistor T10 then being conductive maintains the output signal B1 at ground potential.

It is thus evident that in both cases the level of signal B1 during selection is equal to the level of signal A1, whereas signal $\overline{B1}$ takes over the level which is complementary thereto. This is the desired effect of a true-complement generator.

Figures 3A, 3B:
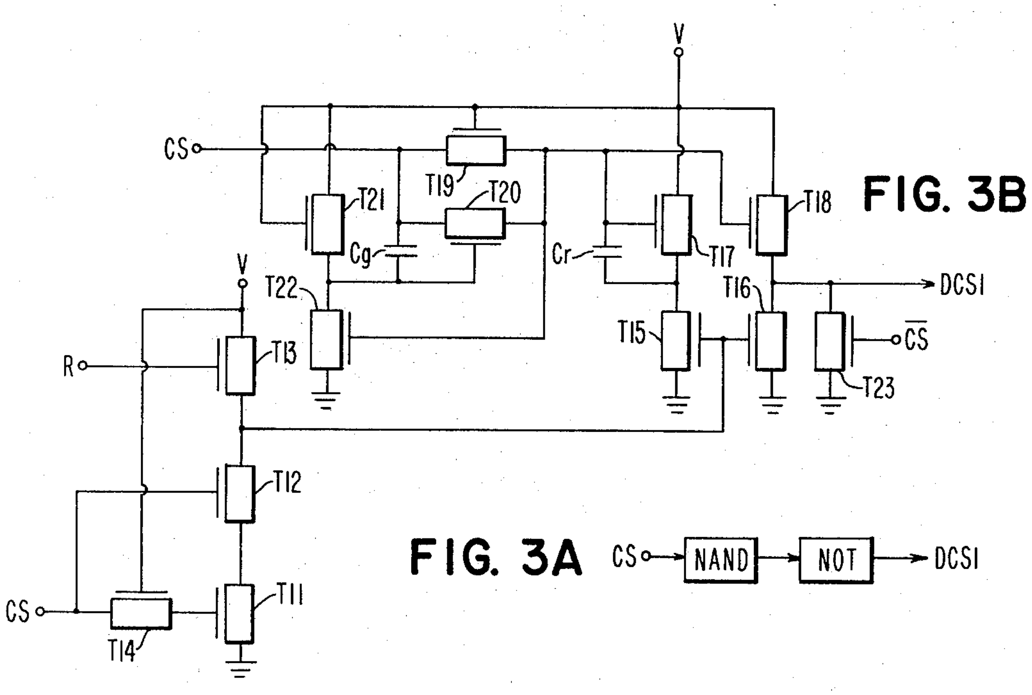
FIG. 3A is a block diagram of a simulation circuit for a true-complement generator.
FIG. 3B is a circuit diagram of an embodiment of the simulation circuit according to FIG. 3A.

As already explained in connection with FIG. 1, the true-complement generator is simulated according to the invention, in order to generate from the chip selection pulse CS a corresponding delayed pulse DCS1. FIG. 3A shows such a simulation circuit 20. The object to be simulated is a NAND gate to which selection pulse CS to be delayed is applied. The function of the NAND gate demands that a NOT, or inverter, gate be arranged in series with the NAND gate in order to obtain the delayed pulse DCS1.

FIG. 3B shows a circuit example for simulation circuit 20. The NAND gate of the simulation consists of transistors T11, T12, and T13. There, a transistor T14 provides the delay, which is required in the true-complement generator, between address pulses A and selection pulse CS. Capacitor *Cc* is simulated by the input capacities of transistors T15 and T16. The inverter of the simulation consists of transistors T15, T16, T17, and T18, bootstrap capacitor Cr having been added for acceleration. Since the inverter is required for logical rather than for delay reasons efforts are made to use an extremely quick inverter. For that reason, and for a further increase of the switching speed of the inverter a circuit consisting of transistors T19 to T22 with a capacitor *Cg* is additionally provided to control the re-charging of capacitor *Cr*. The re-charging of capacitor *Cr* is effected in response to the respective level of selection pulse CS.

When the storage chip is selected, selection pulse CS switches to the value of feeding voltage V, first transistor T12 and then transistor T11 become conductive. Since at CS time precharge pulse R has switched to ground potential transistor T13 is non-conductive. Thus, the input capacity of transistors T15 and T16 is discharged via transistors T12 and T11, with the same time constant as the respective capacitor of true-complement generator capacitors *Cc* or *Ct*. If the input capacity has been discharged to less than the value of threshold voltage VT transistors T15 and T16 are non-conductive. T16 releases the output for the delayed selection pulse DCS1 for charging. The thus generated pulse DCS1 is applied to the correspondingly marked input of the AND gates 3 (FIG. 1) at the outputs of the true-complement generators. Consequently, this pulse does not switch to the value of feeding voltage V until in the true-complement generator one of the two capacitors *Cc* or *Ct* (simultaneously with its simulation) has been discharged, so that the output for signal $\overline{B1}$ or B1 of the true-complement generator that has to remain at ground potential is safely isolated from selection pulse DCS1 by transistor T7 or transistor T8, respectively.

The function of transistor T23 is to provide the quick switching-off of pulse DCS1 after selection is completed. It is addressed by inverted selection pulse CS which is generated, from selection pulse CS, on the semiconductor chip by means of another quick inverter, not shown.

Figure 4:
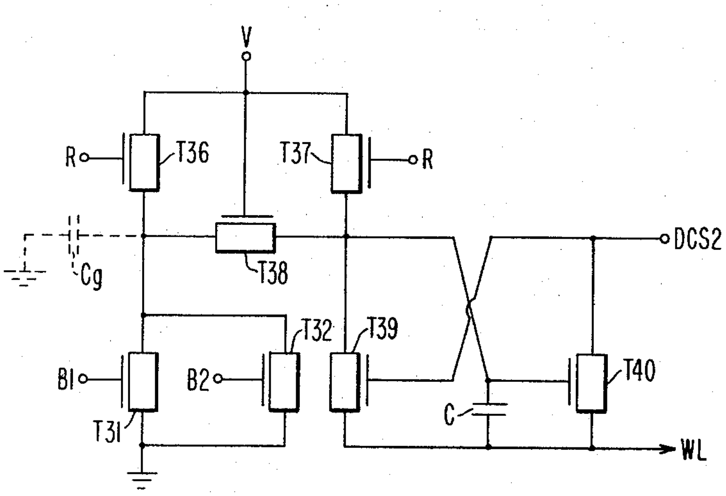
FIG. 4 is a circuit diagram of an embodiment of the decoder that can be used in the selection device of FIG. 1 and consists of a NOR gate, including the AND gate at the output.

FIG. 4 shows the circuit of an embodiment of a decoder, including the DECODE circuit and the AND gate at the output, for example NOR gate 4-1 and AND gate 5-1 of FIG. 1. In the present case, this NOR gate 4-1 provides from signals B1 and B2 the output signal C1 which via AND gate 5-1 is switched to word line WL1. Transistors T31 and T32 represent in a known manner the input transistors of the NOR gate. Transistors T36 and T37 to whose gate precharging pulse R is applied perform the necessary precharging. A transistor T38 serves for the isolation between input and output. The AND gate is formed of transistors T39 and T40.

During the non-selected state signals B1 and B2 at the inputs are at ground potential, as well as delayed selection pulse DCS2. For that reason, transistors T31 and T32 as well as transistors T39 are non-conductive. Precharging pulse R is at a level which is equal to supply voltage V. Therefore, transistors T36 and T37 are conductive so that capacitor C and stray capacity *Cg* are charged to voltage V-VT, VT being the threshold voltage of the field effect transistors T36 and T37, respectively. Transistor T38 becomes non-conductive as its gate-to-source voltage has dropped to the value of threshold voltage VT. Since capacitor C is charged transistor T40 is conductive, so that the connected word line is kept at the potential of DCS2 which is equal to ground potential, as mentioned above.

If the storage chip is selected precharging pulse R switches to ground potential, i.e. transistors T36 and T37 are conductive. If the word line is to be selected, i.e. charged, signals B1 and B2 have to remain at ground potential at selection time. Consequently, transistors T31 and T32 have to be non-conductive simultaneously for capacities C and *Cg* to remain charged. Thus, transistor T40 remains conductive, and pulse DCS2 switching to the value of feeding voltage V is transferred to the word line. In this process, the voltage drop on transistor T40 must not exceed the value of threshold voltage VT in order to keep transistor T39 non-conductive. In this manner, capacitor C remains charged so that during the charging of the word line the gate-to-source voltage of transistor T40 is constant and the latter remains correspondingly conductive. During this process, capacitor C does not lose any charge to stray capacity *Cg* since transistor T38, as mentioned above, is non-conductive.

If the connected word line is not to be selected, i.e. if it is to remain discharged, at least one of input transistors T31 or T32 has to be rendered conductive by a corresponding signal B1, B2. Subsequently, capacities C and *Cg* are discharged via transistors T38 and T31, and T32, respectively. It is only after the discharge to less than the value of threshold voltage VT that transistor T40 is non-conductive. When pulse DCS2 switches to the value of the supply voltage V, transistor T39 is conductive and keeps the connected word line on ground potential via transistor T38 and conductive transistor or transistors T31, T32.

Figure 5:
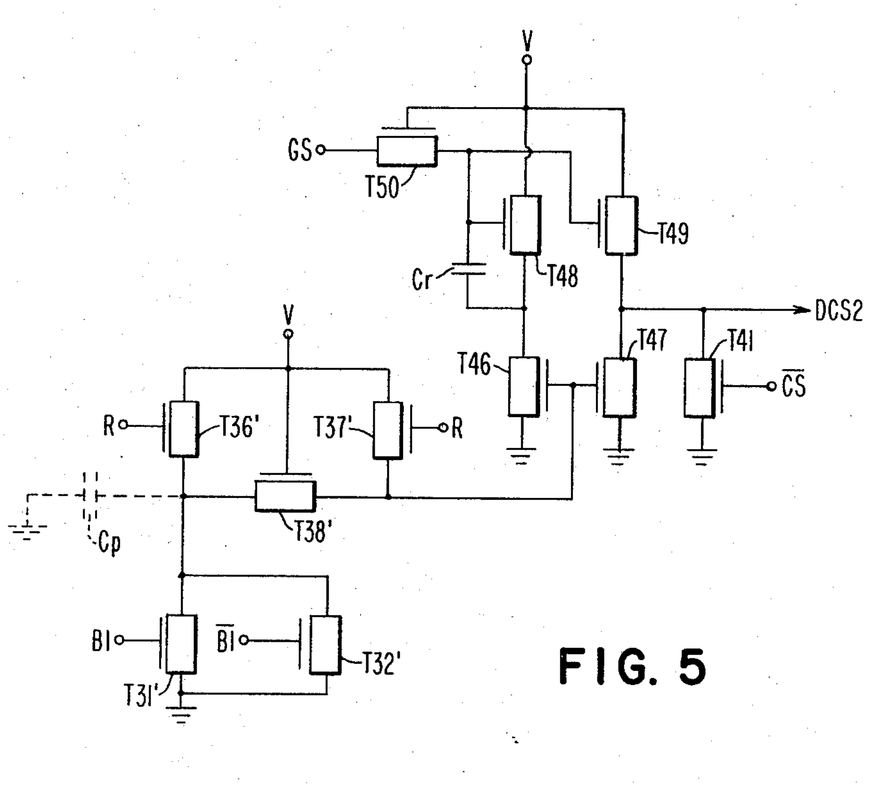
FIG. 5 is a circuit diagram of an embodiment of the simulation circuit for the decoder according to FIG. 4.

FIG. 5 shows an example for a simulation circuit 40 of the given NOR gate. Transistors T31′, T32′, T36′, T37′, and T38′ clearly simulate transistors T31, T32, T36, and T37, and T38 of the NOR gate according to FIG. 4. The stray capacity Cg of the decoder NOR gate is exactly simulated by providing simulation circuit 20 with a corresponding layout to the slowest of decoders 4 to provide stray capacity Cp. Applied to inputs T31′ and T32′ are both the true signal B1 and inverted $\overline{B1}$. This means that upon each selection there is always no output signal at the output of the simulated NOR gate. It is therefore necessary to arrange an inverter in series with the simulation, the inverter supplying the delayed switching pulse DCS2 for AND gates 5 at the output of decoder 4 (FIG. 1). Again, since this inverter is required for logical reasons in the simulation rather than to contribute to the necessary delay, the present embodiment again uses a high-speed inverter mentioned already in connection with FIG. 3B. It consists of transistors T46 to T49, with feedback capacitor Cr. Capacitor C r is charged or discharged, respectively, via a transistor T50 by selection pulse CS. Transistor T41 has the function of switching off quickly pulse DCS2 after terminated selection. T41 is controlled by the inverted selection pulse $\overline{CS}$ which on the chip is generated by means of another quick inverter out of true selection pulse CS. Capacitor C of the decoder is simulated by the input capacity of transistors T46 and T47.

If the storage chip is selected either transistor T31′ or T32′ must be conductive at their inputs during selection are responsive to complementary signals B1 and $\overline{B1}$. These signals correspond to input signals B1, B2 of the word decoder, except that the inputs to a decoder are always supplied by different true-complement generators, whereas in the simulation the inputs originate from one and the same true-complement generator. It is thus ensured that the discharge of the input capacity of transistors T46 and T47 always takes place and with the same delay duration as the discharge of the capacity C of the slowest unselected NOR gate. Once the input capacity, charge on the gates of T46 and T47 has been discharged to less than the value of threshold voltage, transistors T46 and T47 are non-conductive. Only then will transistor T47 release the output for delayed selection pulse DCS2. The thus generated pulse DCS2 is applied to the correspondingly marked input of the AND gate at the output of the decoders. Therefore, pulse DCS2 then switches to the value of supply voltage V when the slowest unselected NOR-gate on the chip has been discharged in the decoder (simultaneously with its simulation), so that there can be no erroneous early selection, and the pulse DCS2 will not switch too late.

The above examples illustrate how the memory selection speed of an integrated circuit memory array can be increased by utilizing on-chip generated delays via simulating the circuits which require sequential clocking.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A logic circuit for providing a delayed logical output signal on an output terminal, comprising:
   - a first logic gating means for performing a predetermined logic function and for providing an inherently delayed output signal, said first logic gating means being responsive to at least one input signal;
   - output gating means responsive to said first logic gating means for providing a logical signal to said output terminal corresponding to said predetermined logic function, said output gating means also being responsive to an output gating clock pulse; and
   - clock pulse generating means for generating said output gating clock pulse after said first logic function has been performed, said clock pulse generating means comprising a second logic gating means for simulating the inherent time delay of said first logic gating means and for always providing a true logical output signal in response to at least one of said input signals.

2. The logic circuit of claim 1 wherein said second logic gating means includes logic gates for performing at least the same predetermined logic function as said first logic gating means.

3. The logic circuit of claim 2 further providing a plurality of first gating means responsive to a plurality of input signals, each of said first gating means providing the same predetermined logic function and having an associated output gating means responsive to said output gating pulse.

4. The logic circuit of claim 3 wherein said first logic gating means comprises a true-complement generator for performing at least a NAND logic function and said second logic gating means simulates the delay of said first logic gating means by performing a NAND function.

5. The logic circuit of claim 1 wherein said first logic gating means comprises a plurality of decoder circuits responsive to the selected outputs of a plurality of true-complement generators, there being one true-complement generator for each binary position of a coded memory address, and further wherein said output gating means comprises a plurality of jointly clocked AND gates and said clock pulse generator comprises a simulated decoder circuit responsive to the two outputs of one of said true-complement generators.

6. The logic circuit of claim 5 wherein said simulated decoder circuit includes the same discrete devices as provided in the decoder circuit having the greatest inherently delayed output signal.

7. The logic circuit of claim 6 wherein all of said logic gates are integrated on the same semiconductor chip.

8. An address selection device for a monolithically integrated storage array having a true-complement generator for each binary position of a coded address word, wherein the outputs of said true-complement generators are connected to associated inputs of a plurality of decoder circuits and at the inputs and outputs of each true-complement generator, and at the output of each of said decoders, there is provided a plurality of jointly clocked AND gates for increasing noise resistance, the improvement comprising clock pulse source means for gating the AND gates at the input and output of each of said true-complement generators;

decoder simulation means responsive to the outputs of the AND gates at the output of one of said true-complement generators for generating a delayed clock signal corresponding to the circuit delay of said decoders; and means connecting said clock signal to the AND gates at the output of each of said decoders.

9. The address selection device of claim 8 wherein each true-complement generator has an input for one of the binary positions of an encoded low order address bit and an input for a higher order address bit and further wherein there is provided an AND gate responsive to said clock pulse source means and said higher order address, and means for applying the output of said last said AND gate to the clock inputs of the AND gates at the output of said true-complement generators.

10. The address selection device of claim 9 wherein the output of the AND gate responsive to said clock pulse source means and said higher order address is applied to the clock inputs of the AND gates of said true-complement generators through a simulation of a true-complement generator.

11. The address selection device of claim 10 wherein each of said true-complement generators comprise an AND and a NAND gate and said simulation of a true-complement generator comprises a NAND gate followed by an inverter gate.

12. The address selection device of claim 10 wherein each true-complement generator comprises an OR and a NOR gate and said simulation of a true-complement generator comprises a NOR gate followed by an inverter gate.

13. The address selection device of claim 8 wherein each decoder comprises a NOR gate and said decoder simulation means comprises a NOR gate followed by an inverter gate.

14. The address selection device of claim 8 wherein each decoder comprises an AND gate and said decoder simulator comprises an AND gate followed by an inverter gate.

15. The address selection device of claim 13 wherein said inverter comprises a fast switching bootstrap circuit.

* * * * *